United States Patent [19]

Matulich

[11] 3,711,044

[45] Jan. 16, 1973

[54] AUTOMATIC INTERFACE CONTROL SYSTEM

[75] Inventor: Dan S. Matulich, Rolling Hills, Calif.

[73] Assignee: The Garrett Corporation, Los Angeles, Calif.

[22] Filed: March 17, 1971

[21] Appl. No.: 125,158

[52] U.S. Cl. ......................244/118 P, 98/1.5, 165/15

[51] Int. Cl. ..............................................B64d 13/08

[58] Field of Search ...................62/239, 241; 98/1.5; 244/118 P

[56] References Cited

UNITED STATES PATENTS

| | | | |
|---|---|---|---|
| 3,326,109 | 6/1967 | Markham | 98/1.5 |
| 2,618,470 | 11/1952 | Brown et al. | 165/15 |
| 2,961,939 | 11/1960 | Typaldos | 98/1.5 |
| 2,991,706 | 7/1961 | Best | 98/1.5 |

*Primary Examiner*—Milton Buchler
*Assistant Examiner*—Stephen G. Kunin
*Attorney*—Albert J. Miller and John N. Hazelwood

[57] ABSTRACT

An automatic interface control system is provided for use between an aircraft environmental control system and a two spool auxiliary power unit. In response to the requirements of the environmental control system, the speed of one of the auxiliary power unit spools is controlled by the interface control system.

9 Claims, 10 Drawing Figures

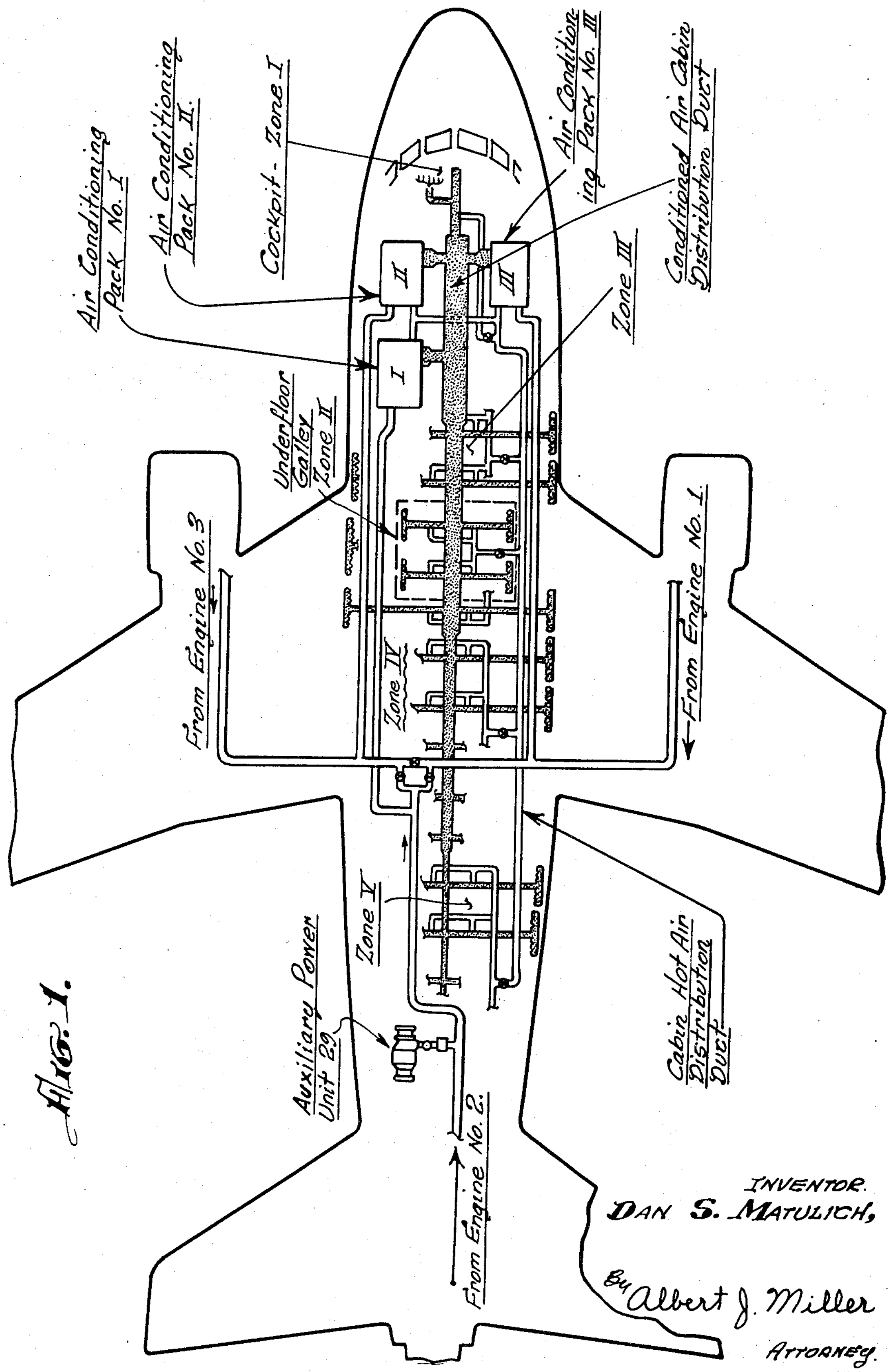
INVENTOR.
DAN S. MATULICH,
By Albert J. Miller
ATTORNEY.

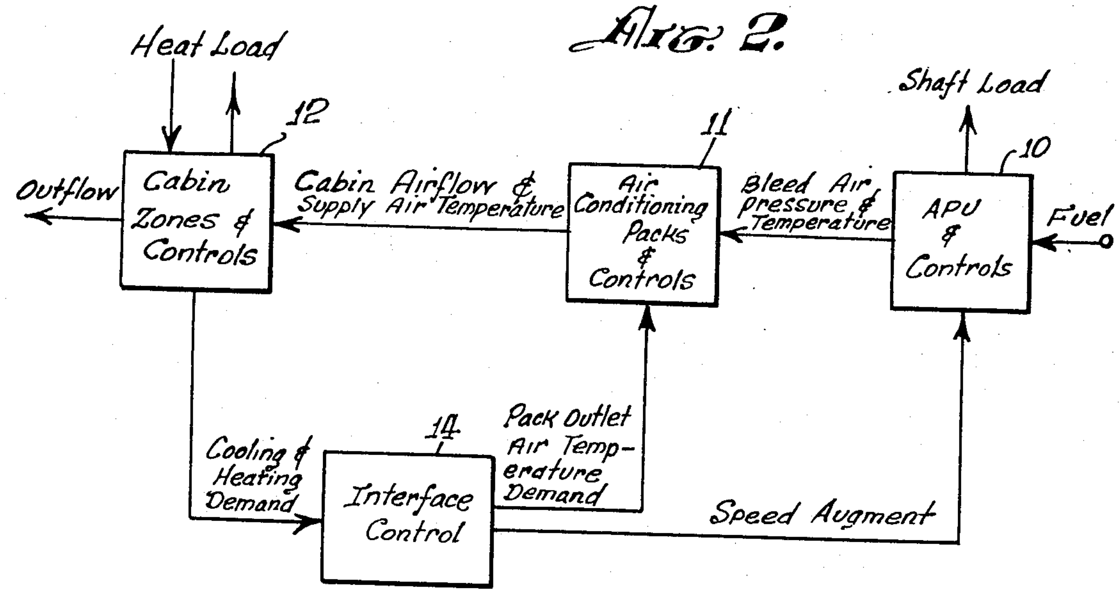
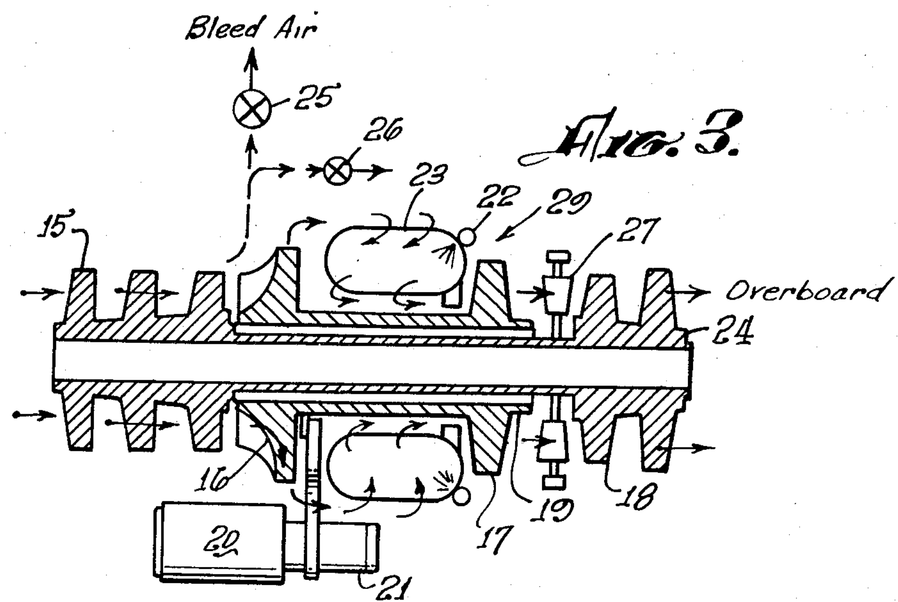
INVENTOR.
DAN S. MATULICH,
By Albert J. Miller
ATTORNEY.

INVENTOR.

DAN S. MATULICH,

By Albert J. Miller

ATTORNEY.

INVENTOR.

DAN S. MATULICH,

By Albert J. Miller

ATTORNEY.

INVENTOR.
DAN S. MATULICH,

By Albert J. Miller
ATTORNEY.

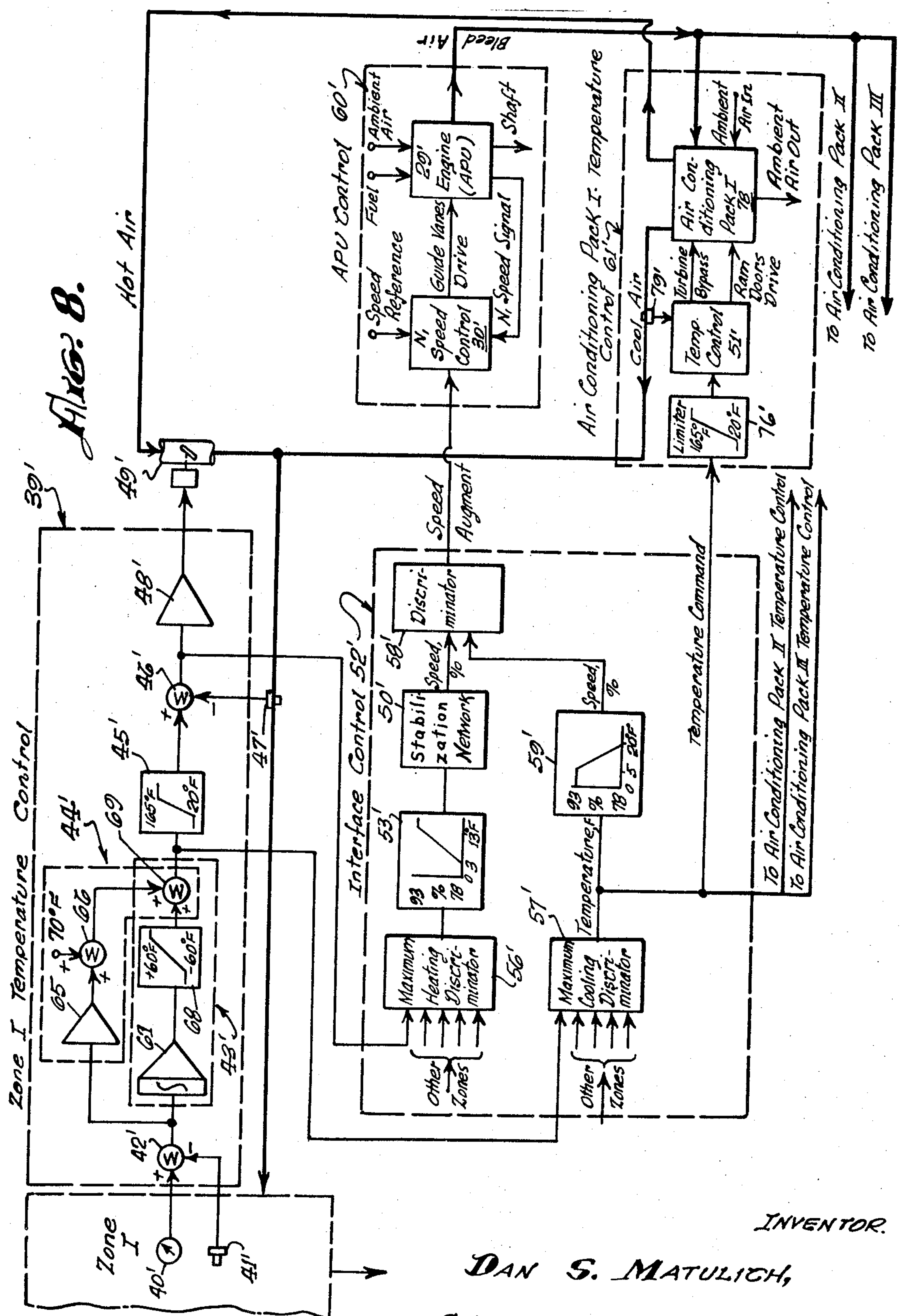
INVENTOR.
DAN S. MATULICH,
By Albert J. Miller
ATTORNEY.

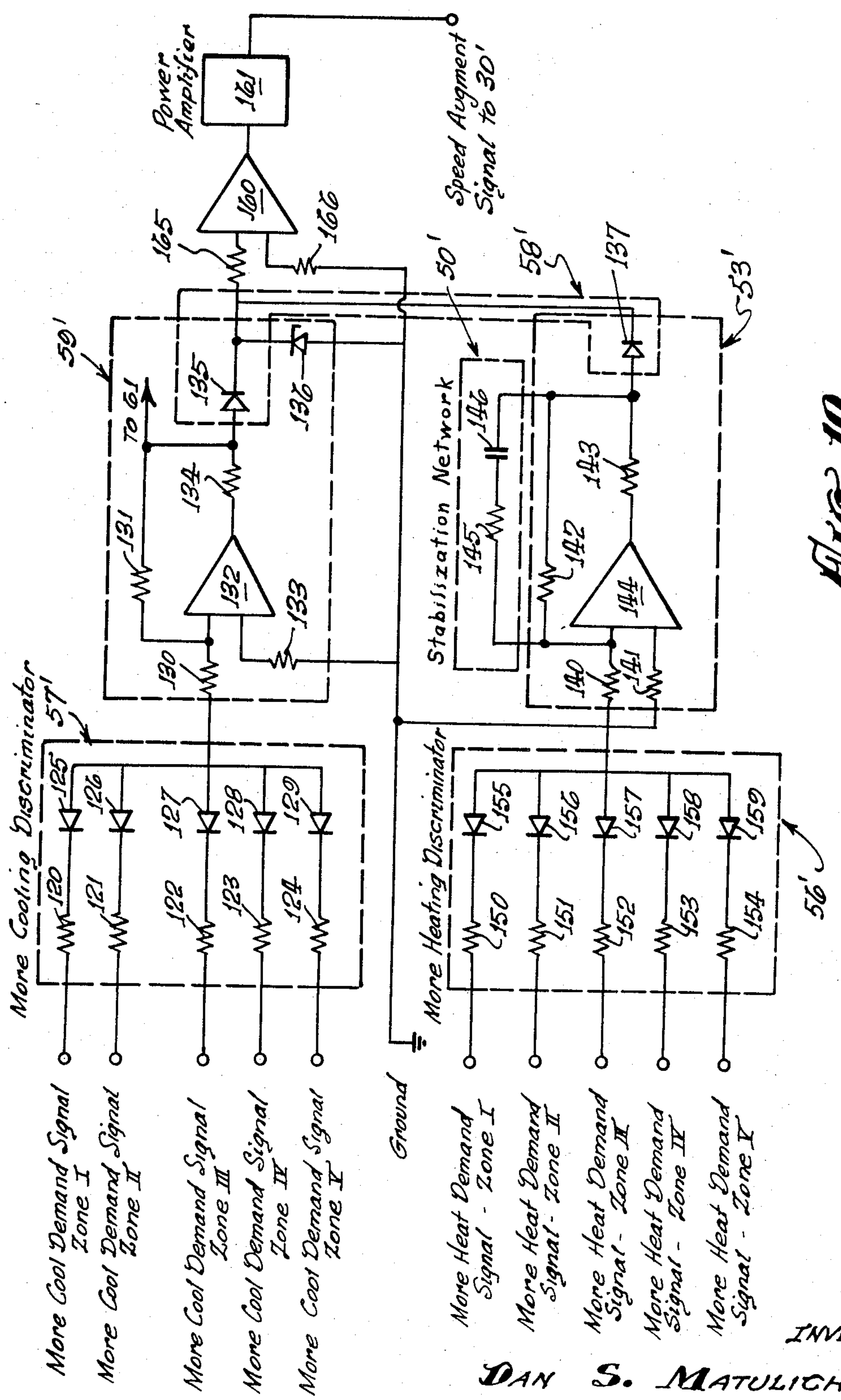
INVENTOR.
DAN S. MATULICH,
By Albert J. Miller
ATTORNEY.

AUTOMATIC INTERFACE CONTROL SYSTEM

BACKGROUND OF THE INVENTION

In the conventional aircraft environmental control system in which an auxiliary power unit such as a gas turbine supplies bleed air to the air conditioning system, the gas turbine runs at its maximum power at all times during operation regardless of the demands of the air conditioning system. Since the air conditioning system only requires maximum bleed air from the gas turbine during intermittent operating conditions, uniform maximum power operation of the gas turbine is highly inefficient. Separate independent consideration and operation of the air conditioning system and auxiliary power unit does not provide for optimum overall performance.

SUMMARY OF THE INVENTION

The invention provides an automatic interface control system between an aircraft Environmental Control System (ECS) and an aircraft Auxiliary Power Unit (APU). The ECS and APU are integrated to provide partial control of the APU in response to ECS requirements.

BRIEF DESCRIPTION OF THE DRAWINGS

FIG. 1 is a schematic representation of an aircraft Environmental Control System (ECS) and Auxiliary Power Unit (APU) in an airframe.

FIG. 2 is a schematic functional diagram of the basic automatic interface control system of the present invention.

FIG. 3 is a schematic drawing of an Auxiliary Power Unit (APU) engine useful with the interface control system of FIG. 2.

FIG. 8 is a schematic functional diagram of the entire automatic interface control system.

FIG. 10 is a schematic circuit diagram of the interface control 52' of FIG. 8.

DESCRIPTION OF THE PREFERRED EMBODIMENTS

Figure 4:
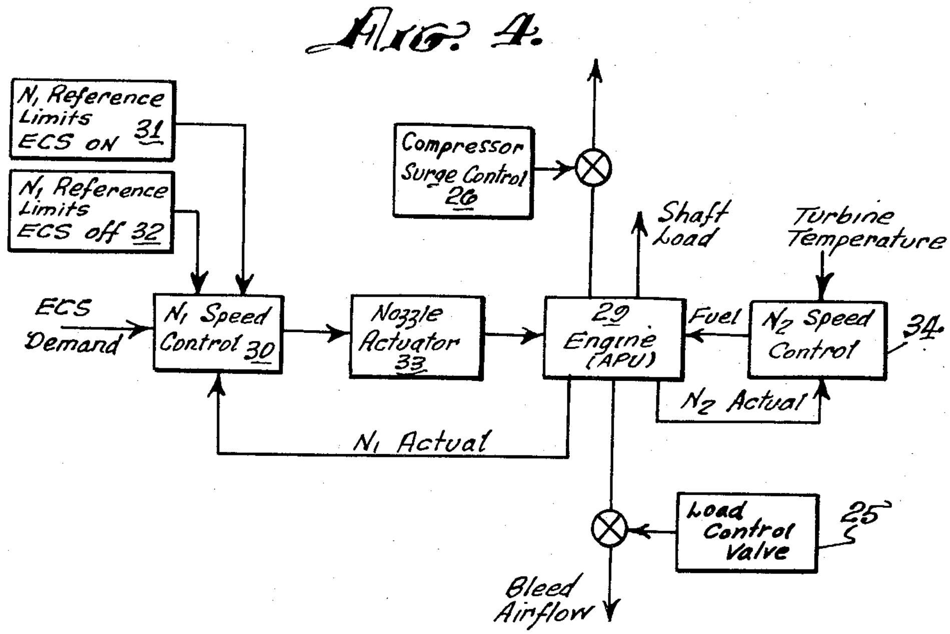
FIG. 4 is a schematic block diagram of the control functions for the APU of FIG. 3.

In FIG. 1 an example of an Environmental Control System (ECS) for a tri-jet, wide-bodied aircraft is schematically illustrated within an airframe. Bleed air from each of the three engines and the Auxiliary Power Unit (APU) is provided to each of five temperature control zones and to three Air Conditioning Packs through cabin hot air distribution ducts. The five temperature control zones include Cockpit Zone I, Underfloor Galley Zone II, Forward Cabin Zone III, Mid Cabin Zone IV, and Aft Cabin Zone V.

The Air Conditioning Packs may be any of the conventional refrigeration units used in aircraft ECS. For example, a three wheel air cycle unit including a single heat exchanger, water separator, water separator temperature control, turbine bypass valve, and ram air inlet and exit controls would be suitable.

The bootstrap compressor and cooling air fan of the refrigeration unit can be mounted on a common shaft which is driven by the refrigeration turbine. Air from the flow control unit is compressed in the bootstrap compressor and discharged into the heat exchanger where the air temperature is reduced to near ambient by the flow of cooling ram air drawn through the heat exchanger by the fan. The cooled compressed air is expanded through the turbine and becomes refrigerated due to the energy extracted from the air to drive the refrigeration unit shaft. The refrigerated air enters the water separator where most of the free moisture content in the air is removed. The free moisture is prevented from freezing by a dew point control valve which is integral with the refrigeration unit. As soon as ice begins to form on a screen in the turbine discharge duct, the increase in pressure drop across the screen opens a valve to admit direct bleed air into the turbine discharge anti-ice muff. This raises the mixed air temperature and dispels the ice.

The temperature of the conditioned air supply to the cabin zones is controlled by a turbine bypass valve, which unloads the refrigeration unit, and a ram air inlet and exit door, which reduces the cooling airflow through the heat exchanger. The ram air inlet and exit doors and the turbine bypass valve may be programmed together mechanically and controlled by an electronic refrigeration pack controller which maintains a specific conditioned air temperature determined by signals received from the cabin zone temperature controllers. The cooled air is distributed to each of the five temperature control zones through the conditioned air cabin distribution ducts shown as stippled in FIG. 1.

The basic automatic interface control system for use between an aircraft Environmental Control System (ECS) and an aircraft Auxiliary Power Unit (APU) is illustrated schematically in FIG. 2. The APU and controls 10 receive fuel and develop a shaft load in addition to the high bleed air pressure and temperature for the air conditioning packs and controls 11 which supply airflow and supply air at the proper temperature for the aircraft cabin zones and controls 12 of the ECS. The interface control 14 receives the heating and cooling demand from the cabin zones and controls 12 and relates a speed augment demand back to the APU and controls 10 and a pack outlet air temperature demand back to the air conditioning packs and controls 11. In this manner the cabin zone temperature sensing intelligence biases the APU speed control by means of the interface control 14 to adjust the air conditioning packs, air pressure, airflow and air temperature to set the zone temperature control.

In order to maintain a selected 75°F temperature constant as the zone heat varies from maximum cooling to maximum heating and from minimum loading to maximum loading, the zone has to be supplied with varied inlet temperatures and/or airflows. To satisfy the zone temperature control, the air conditioning packs are modulated initially from full cooling to full heating capacity while maintaining the APU at minimum power setting. As further capacity increase is required, the cabin zone temperature control intelligence automatically adjusts the APU power setting upward through the interface control 14.

As shown in FIG. 3, a suitable APU 29 may comprise a low pressure compressor 15, high pressure compressor 16, high pressure turbine 17 and low pressure turbine 18. The high pressure compressor 16 and high pressure turbine 17 are on a common high pressure spool 19 which is used to drive AC generator 20 and hydraulic pump 21. The speed of the high pressure spool is regulated to a constant value $N_2$ by a fuel metering control which provides fuel through the fuel nozzles 22 for the combustor 23 whose exhaust gases drive the turbines 17 and 18.

The low pressure compressor 15 and low pressure turbine 18 are on a common low pressure spool 24. Bleed air is extracted from the low pressure spool 24 at a point between the low pressure compressor 15 and high pressure compressor 16 and is controlled by a load valve 25 and surge valve 26. The first stage of the low pressure turbine 18 is provided with variable nozzles 27 so that the speed $N_1$ of the low pressure spool 24 is variable and can be set to match the demands of either the air conditioning or engine starting systems.

Suitable APU controls for the APU 29 of FIG. 3 are illustrated in FIG. 4. An electronic $N_1$ speed control 30 which receives an input from the ECS demand is employed to compare the $N_1$ demand signals from $N_1$ reference limits 31 while ECS is operating ON and $N_1$ reference limits 32 while ECS is operating OFF with the actual $N_1$ speed and uses the error signal to reposition the variable turbine inlet guide vanes of variable nozzles 27 by means of nozzle actuator 33. The APU engine 29 reacts to this change in geometry by a change in the $N_1$ speed. The $N_2$ speed control 34 for the high pressure spool 19 consists of a governor (not shown) that modulates fuel through the fuel nozzles 22. A more detailed description of the APU of FIG. 3 and the APU controls of FIG. 4 can be found in U.S. Pat. application Ser. No. 861,097, filed Sept. 25, 1969 for a Two Spool Auxiliary Power Unit and Control Means and assigned to the same assignee as this application.

Figures 5, 9:
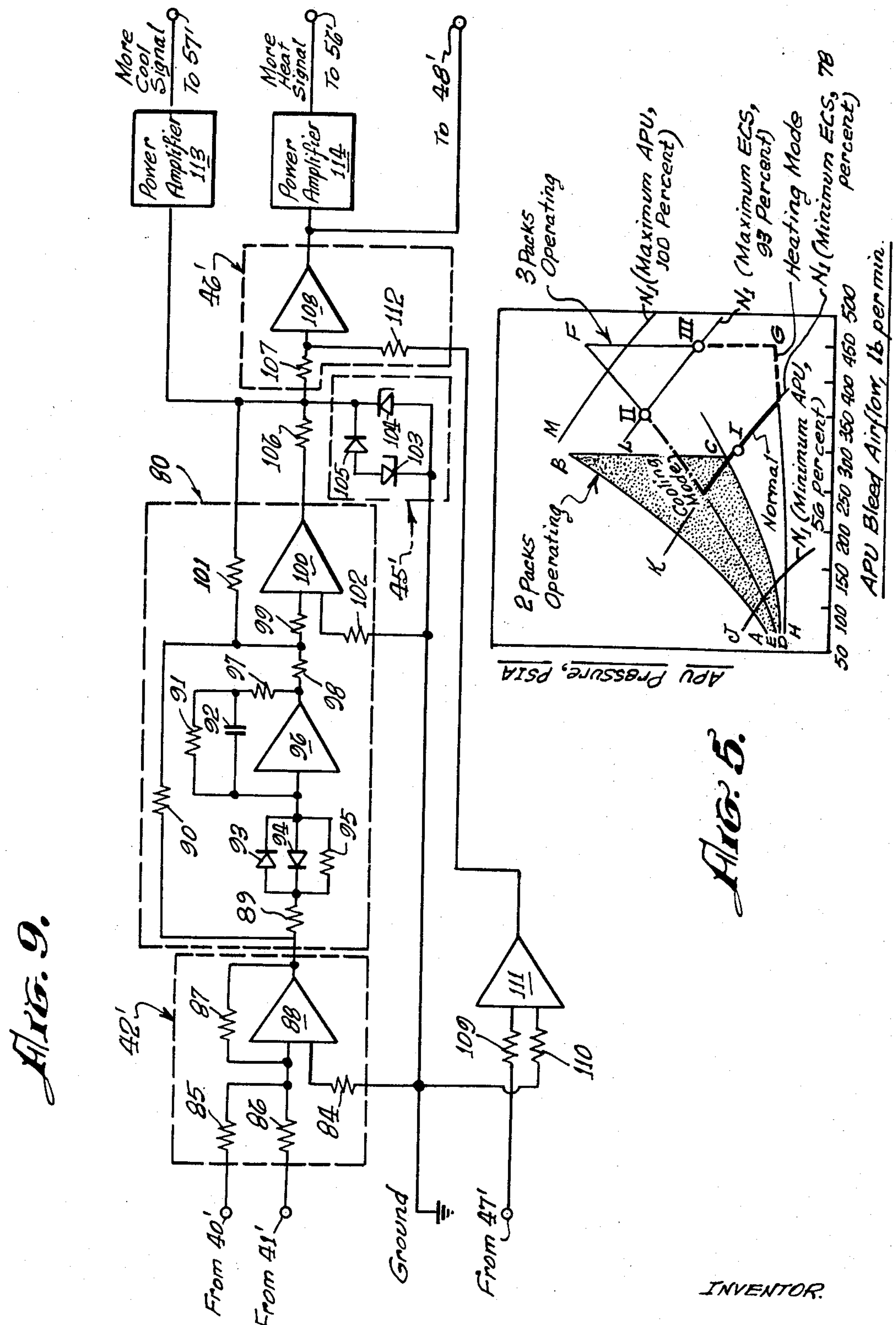
FIG. 5 is a graph of APU pressure versus APU bleed airflow for the interface control system of FIG. 2.
FIG. 9 is a schematic circuit diagram of the zone temperature control 39' of FIG. 8.

The APU pressure versus airflow diagram of FIG. 5 illustrates the actual interface between the air conditioning packs of the ECS and APU design characteristics. Diagram ABCD represents pressure versus airflow for two air conditioning packs operating while diagram EFGH represents pressure versus airflow for three air conditioning packs operating. Line J represents a minimum APU condition of $N_1$ being 56 percent of maximum while line K represents a minimum ECS condition with $N_1$ being 78 percent. Maximum ECS condition with $N_1$ equalling 93 percent is represented by line L. while maximum APU $N_1$ speed of 100 percent is represented by line M. Point I on speed line K denotes the typical mode of operation. The APU speed $N_1$ is 78 percent and bleed airflow from the APU is approximately 300 lbs. per minute. Along this line the air conditioning packs are modulated from full cooling to full heating capacity while maintaining the APU at its minimum APU speed of 78 percent. The air conditioning pack restriction line is an average between the maximum cooling and maximum heating. The maximum cooling condition imposes the maximum pressure restriction on the APU while the maximum heating condition imposes the least pressure restriction on the APU and the flow therefore increases with the heating mode.

When simple modulation between full cooling and full heating at an APU $N_1$ speed of 78 percent can no longer satisfy the air conditioning packs heating and/or cooling requirements, the APU speed is increased from line K towards line L. With the air conditioning packs operating at maximum heating mode at $N_1$ speed of 78 percent, the $N_1$ speed will be increased towards point G at which point the air conditioning pack restriction increases rapidly once the airflow is limited to approximately 450 lbs. per minute. Point III on line L represents the maximum heating supply by the APU as the need arises for higher supply air temperature. As an example, on a −45° F day, $N_1$ APU speed of 78 percent, the supply air temperature will be on the order of 50°F, well below that which is required to heat up the cabin. Under such conditions it is necessary to increase the APU speed in order to increase the supply air pressure and consequently air temperature.

Point II on line L denotes the maximum cooling mode of operation on a very hot day on the order of 110°F. In this case the APU is capable of supplying 350 lbs. of bleed airflow per minute at maximum pressure required to extract the maximum cooling when the $N_1$ APU speed is increased to 93 percent.

The table below shows the fuel consumption at each of operating Points I, II and III and illustrates the potential savings in fuel consumption achieved by modulating $N_1$ speed rather than operating at a fixed $N_1$ speed of 93 percent.

| Temp. Ambient °F | Bleed Airflow lb/min. | Load hp | Mode | Fuel Consumption lb/hr | $N_1$ Speed |
|---|---|---|---|---|---|
| I 65 | 300 | 100 | Normal | 290 | 78% |
| II 65 | 370 | 100 | Maximum Cooling | 415 | 93% |
| III 65 | 450 | 100 | Maximum Heating | 440 | 93% |

Figure 6:
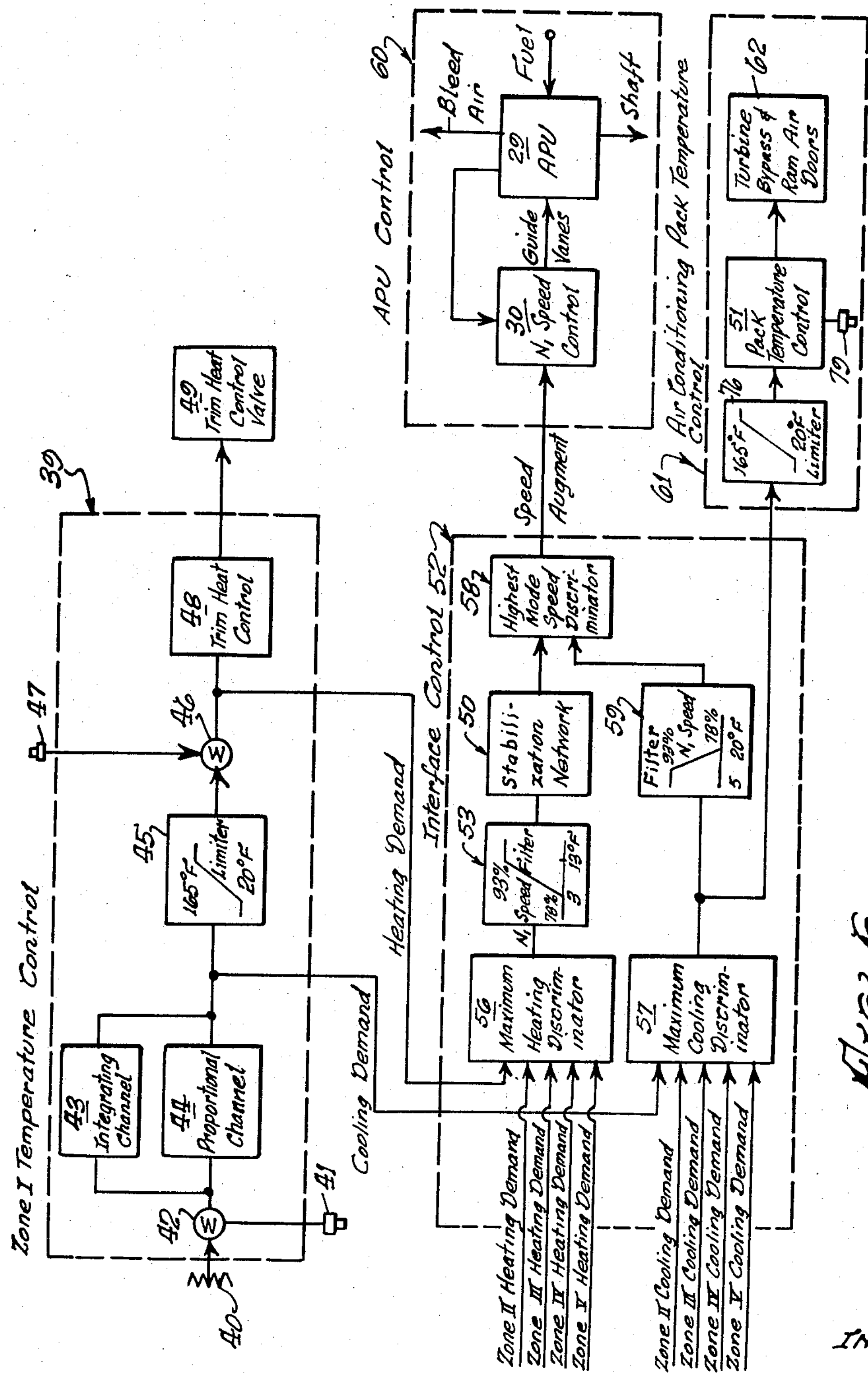
FIG. 6 is a schematic block diagram of the interface control system of FIG. 2.

FIG. 6 schematically illustrates the automatic interface control system between the ECS and the APU. The system basically comprises a zone temperature control 39, interface control 52, APU control 60 and air conditioning pack temperature control 61. While shown in its simplest form for purposes of illustration, it should be recognized that in any system there may be a plurality of zone temperature controls 39, one for each cabin zone with each having its own associated elements. Likewise, there may be a plurality of air conditioning pack temperature controls 61, one for each air conditioning pack with each of these having its own temperature sensor. The air conditioning pack controls are interfaced with the zone temperature controls via a single interface control unit 52.

The interface control 52 receives the heating and/or cooling demands from all respective zones and generates the maximum cooling and/or heating demand signals in a normal mode of operation corresponding to an $N_1$ APU speed of 78 percent. The maximum cooling demand signal is utilized to set the desired air conditioning pack outlet air temperature in a preselected range, for example, from 20° to 165°F. The air conditioning packs, therefore, operate in parallel, supplying identical supply air temperature, satisfying at least one of the plurality of temperature control areas. If there are slight variations in heat load among them, so that one zone requires a few degrees higher air temperature than another zone, small heat supply trim valves are automatically adjusted to the desired position, thus increasing the supply air temperature above that supplied by the air conditioning packs. Each zone, therefore, has an independent control means of adding heat through the modulation of the small trim heat supply valves. It is only when these trim heat supply valves are unable to satisfy the zone temperature controls that it is necessary to increase the $N_1$ APU speed above 78 percent and augment the available capacity to match the increased load requirements.

In its simplest form, the zone temperature control 39 for zone I utilizes a zone temperature selector 40 and zone temperature sensor 41 fed to a summer 42 to produce an error signal. This error signal is amplified through either an integrating channel 43 or a proportional channel 44 to produce a cooling demand to the interface control 52. This same signal is fed to limiter 45 to form a zone inlet temperature demand signal in a preselected range, for example, between 20° and 165°F. This limited signal is then fed to summer 46 which compares it to a signal from the zone inlet temperature sensor 47 to provide a heating demand signal to the trim heat control 48 which controls the trim heat control valve 49.

The zone I heating demand signal is also fed to the maximum heating discriminator 56 in the interface control 52 which also receives heating demand signals from each of the other zones to produce a command signal corresponding to the maximum heating required. Four other zone inputs are shown for purposes of illustration. The signal from the heating mode speed filter 53, which receives this command signal from the discriminator 56, is passed through the stabilization network 50 and then to the highest mode speed discriminator 58 which provides a speed augment command to the $N_1$ speed control 30 of the APU control 60.

The cooling demand signals from all temperature zone controls 39 are likewise fed to the interface control 52. The cooling demand signal from zone I, together with the cooling demand signals from zones II, III, IV and V, is fed to a maximum cooling discriminator 57 to produce a command signal for the air conditioning pack control 51 of the air conditioning pack temperature control 61 to adjust it to the highest cooling demand (lowest supply air temperature) required. The air conditioning pack control 51 receives this command signal through limiter 76.

As an example, if the lowest of the plurality of zone inlet temperature demands is 45°F, the pack temperature control 51 of the air conditioning pack temperature control 61 will adjust the turbine bypass and ram air doors 62 to supply a 45°F air temperature. In the event that another zone temperature control is demanding slightly higher air, say 50°F, zone inlet air temperature, the necessary compensation will be made by independently adjusting the trim heating valve 49 and thereby increasing the zone inlet temperature by 5°F.

The command signal from the discriminator 57 is also provided to the highest mode speed discriminator 58 through the cooling mode speed filter 59. The discriminator 58 selects between the signal received from network 50 and filter 59 to send a speed augment signal to $N_1$ speed control 30. The $N_1$ speed control 30 controls the $N_1$ speed of the APU 29.

Figure 7:
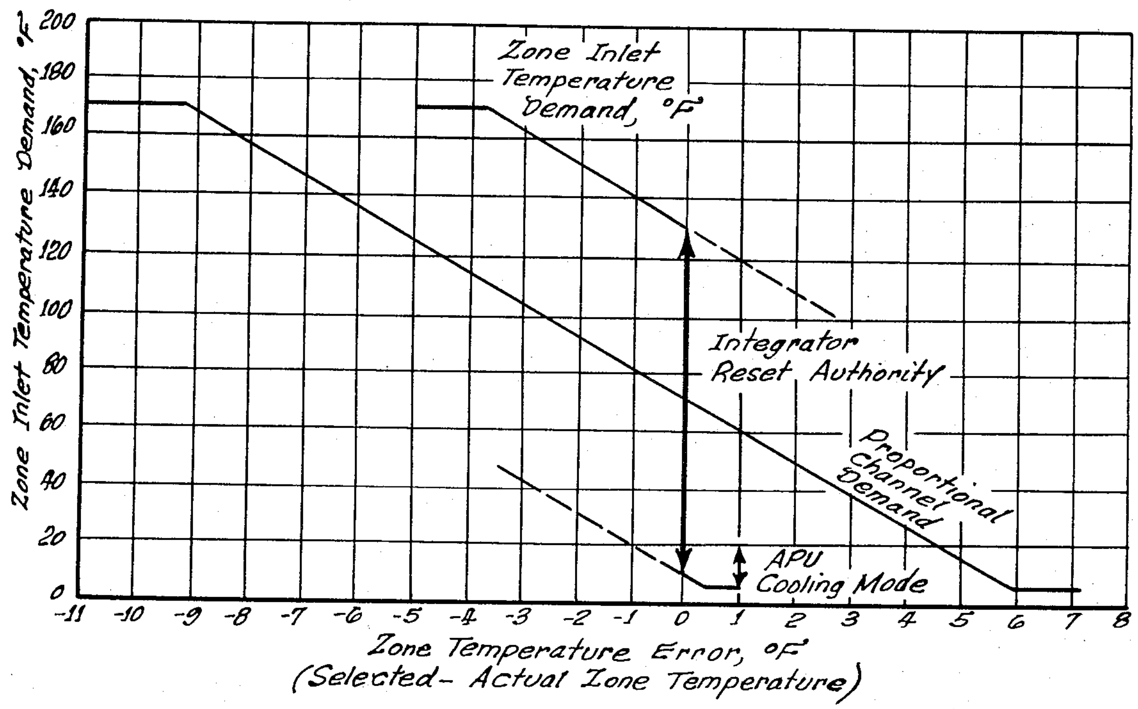
FIG. 7 is a graph of the proportional plus integrating control scheme characteristics of the zone temperature control of FIG. 6.

The characteristics of the proportional plus integrating control scheme of the zone temperature control 39 are provided graphically in the FIG. 7. The zone temperature control 39 incorporates a proportional channel 44 and an integrating channel 43. Typically, a zone temperature control would only have a proportional channel with a proportionally amplified error signal. Generally, an error of 1°F can be amplified by any desired factor but the higher the amplification, the less stable the temperature control system. A proportional channel with a gain of 11, meaning that a 1°F change would impose only an 11°F change at the zone inlet, is not adequate for accurate zone temperature control.

On the other hand, the characteristic of the integrating channel is that for a given error at its input, it integrates this error as a function of time, thus, for an error of 1°F at its input, an integrator with a gain of 1/17 per second will have an output of 1°F after 17 seconds. Therefore to compensate for the low accuracy of a low gain proportional channel, the integrator can be utilized to eliminate any proportional error in time. This compensation provides for a stable and accurate overall temperature control system as shown schematically in the graph. The integrator output is limited to the normal operating inlet temperature demand range of 10°F minimum and 130°F maximum. In this manner, the undesirable temperature overshoot can be prevented after restarting the system operation while integrator output is in its extreme setting.

The electronic interface control system of FIG. 6 is illustrated in more detail in FIG. 8. Summer 42' produces an error signal from zone I temperature selector 40' and zone I temperature sensor 41', and feeds this error signal to the integrating channel 43' and proportional channel 44'. The integrating channel 43' comprises a null reset integrator 67 and an integrator reset authority limiter 68. The proportional channel 44' comprises a proportional channel amplifier 65 and summer 66 to bias the proportional channel signal to a preselected temperature, for example, 70°F. The proportional and integrating channels share summer 69 which produces the zone inlet temperature demand signal. This signal is fed to the maximum cooling discriminator 57' of the interface control 52' for More Cool and also to the zone inlet temperature demand limiter 45' for More Heat. Summer 46' receives the signal from the limiter 45' and the signal from the zone inlet temperature sensor 47' to produce a heating demand (More Heat) signal which is fed to the maximum heating discriminator 56' of the interface control 52' and to the control power amplifier 48' which controls the trim heat control valve 49'.

The maximum heating discriminator 56' receives the More Heat signal from each of the zones and selects the maximum heating signal to pass to the APU speed heating mode filter 53' which produces a signal for the stabilization network 50'.

Likewise, the maximum cooling discriminator 57' receives the More Cool signals from each of the zones and selects the maximum cooling signal which is fed to the APU speed command cooling mode filter 59' and the limiter 76' of the air conditioning pack I temperature control 61' and any other air conditioning pack temperature controls (Packs II and III). The highest mode APU speed discriminator 58' receives the signal from the stabilization network 50' and the APU speed command cooling mode filter 59' to produce a speed augment signal for the $N_1$ speed control 30' which controls the $N_1$ speed of APU engine 29'.

The limiter 76' produces a temperature command signal for the temperature control 51' of the air conditioning pack temperature control 61'. Control 51' also receives a signal from the air conditioning pack outlet air temperature sensor 79'. Air conditioning pack I 78 receives bleed air from the APU engine 29' plus ambient air to produce cool air for zone I. Bleed air from the APU engine 29' is passed through the air conditioning pack I 78 airflow control to limit the total bleed airflow used. A portion of this flow is then fed through the trim control valve 49' while the remainder is conditioned in the air conditioning pack I 78.

As shown in FIG. 9, the summer 42' may comprise a circuit of resistors 84, 85, 86 and 87 plus summing amplifier 88. The integrating channel 43' and proportional channel 44' may together comprise circuit 80 including resistors 89, 90, 91, 95, 97, 98, 99, 101, and 102 plus capacitor 92, diodes 93 and 94 and operational amplifiers 96 and 100.

The circuit for the temperature command limiter 45' comprises diode 105 and zener diodes 103 and 104. The summer 46', comprising resistors 107 and 112 plus summing amplifier 108 is connected to the circuit 80 through resistor 106. Operational amplifier 111 receives signals from summer 42' through resistor 110 and a signal from the zone inlet temperature sensor 47' through resistor 109 provide a signal to the summer 46' which produces a signal for the control power amplifier 48' and the maximum heating discriminator 56' through a power amplifier 114. The maximum cooling discriminator 57' receives a signal through power amplifier 113.

As shown in FIG. 10, the maximum cooling discriminator 57' comprises resistors 120, 121, 122, 123 and 124 connected in parallel plus diodes 125, 126, 127, 128 and 129. Each resistor receives a More Cool demand signal from one of the five zones. The APU speed command cooling mode filter 59' comprises resistors 130, 131, 133, 134, operational amplifier 132 plus diodes 135 and 136.

The maximum heating discriminator 56' likewise comprises a parallel circuit of resistors 150, 151, 152, 153 and 154 plus diodes 155, 156, 157, 158 and 159 and receives More Heat demand signals from the same five zones. The stabilization network 50' comprises resistor 145 and capacitor 146 and is connected in parallel to the APU speed command heating mode filter 53' which comprises resistors 140, 141, 142 and 143, operational amplifier 144, and diode 137. Diodes 135 and 137 also comprise the maximum APU speed mode discriminator 58'. Signals from the APU speed command cooling mode filter 59' and APU speed command heating mode filter 53' are fed to operational amplifier 160 through resistor 165. Amplifier 160 is also connected to ground through resistor 166. A speed augmenting signal to the APU $N_1$ speed control 30' is provided through power amplifier 161.

Generally the zone inlet temperature can be achieved in three separate ways. First, it can be adjusted by modulating the air conditioning packs outlet temperature, second, it can be adjusted with the trim heat valve and its associated controls and third, the desired zone inlet temperature can be attained by adjusting the APU speed in the range between 78 to 93 percent.

In the air conditioning pack temperature control mode, the demand zone inlet temperature demand is discriminated among five different zone inlet temperature signals. The lowest temperature demand signal is fed simultaneously to all air conditioning pack controls and is compared with actual pack outlet temperatures. Any difference from this comparison will modulate the air conditioning pack control valves. The turbine bypass valve will adjust the amount of cooling achieved in the turbine while the ram air door adjusts the amount of cooling achieved through the heat exchanger and the ram air circuit.

In the trim heating mode, each zone inlet temperature demand feeds the corresponding zone inlet temperature control and this demand is compared with the actual zone inlet temperature. The resulting error is amplified and the trim heat valve moves automatically to a new desired position.

In the case where the air temperature supplied by the APU is too low, and the trim valve is already opened completely causing the error between the demanded and actual inlet temperature to persist in excess of a nominal 3°F, the APU speed will then be increased. The setting of 3°F is maintained to insure that the APU speed augmentation is used only when absolutely necessary. If the error increases from 3°F to say 15°F, the APU speed will increase proportionally from 78 to 93 percent.

In the cooling mode, the cabin temperature error signal, indicating that more airflow at low temperature is required, is also used as a means of increasing the APU speed. As soon as the cabin inlet temperature demand drops below 20°F, it is assumed that all available cooling capacity extracted through the air conditioning packs operated at 78 percent of APU speed is exhausted. Since the air conditioning packs should not supply air at temperatures lower than 25° to 35°F, depending upon the humidity of air, an increase in cooling capacity can only be achieved by augmenting the airflow. Once the zone inlet temperature demand drops to 5°F, the APU speed is programmed to reach 93 percent and the maximum airflow is supplied to the zone.

To augment APU $N_1$ speed, signals are fed from all five zone temperature controls. Each zone temperature control is supplying two signals, one for heating and the other for cooling. These ten temperature control signals feed the interface control. The signals are first discriminated as to their maximum heating or maximum cooling demand. The heating and cooling maximum signals are then discriminated among each other in order to determine which one requires the highest speed. In this fashion, any incompatibility between desired heating and cooling capacities is eliminated. The zone temperature control which has the highest heating or cooling load, creates the demand signal corresponding to the highest APU speed and dictates the highest APU airflow, pressure and temperature. In this manner all other zone temperature controls have more than adequate cooling or heating capacity. These other zones will automatically adjust through their respective zone inlet temperature controls or air conditioning pack temperature controls to maintain a constant selected zone temperature. In this manner, the APU fuel consumption is minimized and its reliability and life increased. The interface between the ECS and APU is relatively simple and minimizes operator attention while maintaining maximum response to cooling and heating demands.

While specific embodiments of the invention have been illustrated and described, it is to be understood that these embodiments are provided by way of example only and that the invention is not to be construed as being limited thereto, but only by the proper scope of the following claims.

What I claim is:

1. An aircraft automatic interface control system comprising:

- a turbomachine mounted upon said aircraft to produce a power output and bleed air, said turbomachine having a high pressure spool and a low pressure spool;
- at least one air conditioning means to receive and condition bleed air from said turbomachine;
- at least one temperature controlled zone in said aircraft to receive conditioned air from said air conditioning means; and
- interface control means operably associated with said turbomachine, said air conditioning means, and said temperature controlled zone to provide a demand signal to said air conditioning means and to vary the speed of the low pressure spool of said turbomachine if the air conditioning means cannot satisfy the demand signal.

2. An aircraft automatic interface control system comprising:

- a turbomachine mounted upon said aircraft to produce a power output and bleed air, said turbomachine having a high pressure spool and a low pressure spool, said low pressure spool including means to control the speed thereof;
- at least one air conditioning means to receive and condition bleed air from said turbomachine;
- at least one temperature controlled zone in said aircraft to receive conditioned air from said air conditioning means and bleed air from said turbomachine;
- temperature control means for each temperature controlled zone to produce cooling and heating demand signals for each zone;
- means responsive to the heating demand signal to control the flow of bleed air from said turbomachine to said zone; and
- interface control means operably associated with said turbomachine, said air conditioning means and said zone temperature control means to receive the cooling and heating demand signals from each of said temperature control means to produce a control signal for said air conditioning means and a speed command signal for the low pressure spool of said turbomachine.

3. The aircraft automatic interface control system of claim 2 wherein said interface control means comprises:

- a maximum heating discriminator to receive a heating demand signal from the temperature control means for each temperature controlled zone and to select the maximum heating demand signal;
- a maximum cooling discriminator to receive a cooling demand signal from the temperature control means for each temperature controlled zone and to select the maximum cooling demand signal, said maximum cooling demand signal fed to said air conditioning means;
- a heating mode speed filter to receive the maximum heating demand signal from said maximum heating discriminator and to produce a speed command signal within preselected limits;
- a cooling mode speed filter to receive the maximum cooling demand signal from said maximum cooling discriminator and to produce a speed command signal within preselected limits;
- a stabilization network to receive the speed command signal from said heating mode speed filter and to produce a compensated heating mode speed command signal; and
- a speed discriminator to receive the speed command signal from said cooling mode speed filter and the compensated speed command signal from said heating mode speed filter and to select the highest mode speed command signal for the low pressure spool of said turbomachine.

4. An aircraft automatic interface control system comprising:

- a plurality of individual temperature controlled zones within the aircraft;
- a plurality of air temperature sensors, one temperature sensor sensing the air temperature of each zone to produce a signal indicative thereof;
- a plurality of air temperature selectors, one temperature selector for each zone to produce a signal corresponding to the air temperature selected for each zone;
- a plurality of temperature control means, one temperature control means receiving the air temperature sensor signal and the air temperature selector signal from each zone to produce a cooling demand signal and a heating demand signal for each zone;
- a turbomachine mounted upon said aircraft to produce a power output and bleed air, said turbomachine having a high pressure spool and a low pressure spool, said low pressure spool including means to control the speed thereof;
- a plurality of air conditioning means to receive and condition bleed air from said turbomachine and to provide conditioned air to each of said temperature controlled zones;
- a plurality of bleed air control means to receive bleed air from said turbomachine and to mix bleed air with conditioned air from said plurality of air conditioning means before the conditioned air is provided to each of the temperature controlled zones, each of said bleed air control means receiving the heating demand signal from one of said temperature control means; and
- interface control means operably associated with said turbomachine, said plurality of air conditioning means and said plurality of temperature control means to receive a cooling demand signal and a heating demand signal from each temperature control means to produce a control signal for each of said air conditioning means and a speed command signal for the low pressure spool of said turbomachine.

5. The aircraft automatic interface control system of claim 4 wherein the temperature control means comprise:

first summing means to receive the signal from an air temperature sensor and the signal from an air temperature selector to produce an error signal;

a proportional channel and an integrating channel in parallel to receive the error signal from said first summing means to produce the cooling demand signal for said interface control means;

a limiter to also receive the cooling demand signal;

an air temperature sensor in the conditioned air supplied to the zone to produce a signal indicative thereof; and second summing means to receive the signal from said limiter and the signal from said temperature sensor to produce the heating demand signal.

6. The aircraft automatic interface control system of claim 5 wherein the integrating channel comprises in series a null reset integrator, an integrator reset authority limiter, and a third summing means and said proportional channel comprises in series an amplifier and biasing summing means and the third summing means of the integrating channel.

7. The aircraft automatic interface control system of claim 4 wherein the interface control means comprises:

a maximum heating discriminator to receive a heating demand signal from the temperature control means for each temperature controlled zone and to select the maximum heating demand signal;

a maximum cooling discriminator to receive a cooling demand signal from the temperature control means for each temperature controlled zone and to select the maximum cooling demand signal, said maximum cooling demand signal fed to said air conditioning means;

a heating mode speed filter to receive the maximum heating demand signal from said maximum heating discriminator and to produce a speed command signal within preselected limits;

a cooling mode speed filter to receive the maximum cooling demand signal from said maximum cooling discriminator and to produce a speed command signal within preselected limits;

a stabilization network to receive the speed command signal from said heating mode speed filter and to produce a compensated heating mode speed command signal; and a speed discriminator to receive the speed command signal from said cooling mode speed filter and the compensated speed command signal from said heating mode speed filter and to select the highest mode speed command signal for the low pressure spool of said turbomachine.

8. The aircraft automatic interface control system of claim 7 wherein:

said maximum heating discriminator comprises a first network of resistances and diodes;

said maximum cooling discriminator comprises a second network of resistances and diodes, said heating mode speed filter comprises a network of resistances, an amplifier and a diode;

said stabilization network comprises a series connected resistor and capacitor in parallel with a portion of the heating mode speed filter network;

said cooling mode speed limiter comprises a network of resistances, an amplifier, a diode, and a zener diode; and said speed discriminator comprises the diode of the heating mode speed filter and the diode of the cooling mode speed filter.

9. The aircraft automatic interface control system of claim 4 wherein said turbomachine includes:

a low pressure spool having a low pressure compressor mounted at one end thereof and a low pressure turbine mounted at the other end thereof, said low pressure turbine having variable nozzles to control the speed of the low pressure spool;

a high pressure spool concentrically arranged about said low pressure spool between the low pressure compressor and the low pressure turbine, said high pressure spool having a high pressure compressor at one end of the high pressure spool operably associated with the low pressure compressor and a high pressure turbine at the other end thereof operably associated with the low pressure turbine; and means to extract bleed air from between the low pressure compressor and the high pressure compressor.

* * * * *